(12) United States Patent
Yamaguchi (10) Patent No.: US 11,340,563 B2
(45) Date of Patent: May 24, 2022

(54) MANAGEMENT SYSTEM AND MANAGEMENT DEVICE FOR A PLURALITY OF INDUSTRIAL MACHINES SUPPLIED WITH POWER FROM A POWER SUPPLY FACILITY

(71) Applicant: FANUC CORPORATION, Yamanashi (JP)

(72) Inventor: Akira Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 148 days.

(21) Appl. No.: 16/788,312

(22) Filed: Feb. 12, 2020

(65) Prior Publication Data

US 2020/0257253 A1  Aug. 13, 2020

(30) Foreign Application Priority Data

Feb. 13, 2019  (JP) .............................. JP2019-023992

(51) Int. Cl.
*G05B 13/02* (2006.01)
*G05B 19/418* (2006.01)

(52) U.S. Cl.
CPC ... *G05B 13/0265* (2013.01); *G05B 19/41865* (2013.01)

(58) Field of Classification Search
CPC .......... G05B 13/0265; G05B 19/41865; G05B 2219/32258; G05B 2219/32021;
(Continued)

(56) References Cited

U.S. PATENT DOCUMENTS

| 9,671,846 B1* | 6/2017 | Davis ................... G06F 1/3206 |
| 2017/0227950 A1 | 8/2017 | Kinoshita et al. |
| 2017/0261967 A1 | 9/2017 | Shimura et al. |

FOREIGN PATENT DOCUMENTS

| JP | H10108364 A | 4/1998 |
| JP | 200592827 A | 4/2005 |
(Continued)

OTHER PUBLICATIONS

Hu, Shaohua, et al. "An on-line approach for energy efficiency monitoring of machine tools." Journal of cleaner production 27 (2012): 133-140. (Year: 2012).*

(Continued)

*Primary Examiner* — Michael D Masinick
(74) *Attorney, Agent, or Firm* — Hauptman Ham, LLP (57) ABSTRACT

A management device includes a data acquisition unit that collects data related to power consumption supplied to a plurality of industrial machines from at least a power supply facility, a preprocessing unit that creates power consumption data based on the collected data, a decision making unit that determines a behavior of allocating a predetermined total suspension time to the plurality of industrial machines with respect to a current state of power consumption by the plurality of industrial machines with reference to a learning model associating a value of a behavior of allocating the predetermined total suspension time to the plurality of industrial machines with a state of power consumption by the plurality of industrial machines based on power consumption data, and a suspension time allocation unit that allocates the suspension time to the plurality of industrial machines.

6 Claims, 6 Drawing Sheets

(58) Field of Classification Search
CPC ......... Y02P 90/02; Y02P 70/10; G06Q 50/04;
G06Q 10/06312; G06N 20/00
See application file for complete search history.

(56) References Cited

FOREIGN PATENT DOCUMENTS

| | | |
|---|---|---|
| JP | 2014160359 A | 9/2014 |
| JP | 2017142595 A | 8/2017 |
| JP | 2017-162300 A | 9/2017 |
| JP | 201822432 A | 2/2018 |

OTHER PUBLICATIONS

Bi, Z. M., and Lihui Wang. "Optimization of machining processes from the perspective of energy consumption: A case study." Journal of manufacturing systems 31.4 (2012): 420-428. (Year: 2012).*
He, Yan, et al. "An energy-responsive optimization method for machine tool selection and operation sequence in flexible machining job shops." Journal of Cleaner Production 87 (2015): 245-254. (Year: 2015).*
Wójcicki, Jeremi, and Giacomo Bianchi. "Minimization of energy consumption of a machine tool: a multi-level approach." 23rd ABCM International Congress of Mechanical Engineering. https://doi.org/10.20906/CPS/COB-2015-2719. 2015. (Year: 2015).*
Frigerio, Nicla, and Andrea Matta. "Energy efficient control strategy for machine tools with stochastic arrivals and time dependent warm-up." Procedia CIRP 15 (2014): 56-61. (Year: 2014).*

* cited by examiner

MANAGEMENT SYSTEM AND MANAGEMENT DEVICE FOR A PLURALITY OF INDUSTRIAL MACHINES SUPPLIED WITH POWER FROM A POWER SUPPLY FACILITY

RELATED APPLICATION

The present application claims priority to Japanese Application Number 2019-023992 filed Feb. 13, 2019, the disclosure of which is hereby incorporated by reference herein in its entirety

BACKGROUND OF THE INVENTION

1. Field of the Invention

The application relates to a management device and a management system.

2. Description of the Related Art

A plurality of industrial machines such as machine tools, injection molding machines, and robots installed in a manufacturing site such as a factory is operating based on commands from individual controllers that control the industrial machines. The plurality of industrial machines is connected to a predetermined power supply facility and operates by consuming power supplied from the power supply facility (for example, JP 2017-162300 A). In this instance, when a plurality of industrial machines execute commands consuming a lot of power at the same timing, power shortages occurs due to total power consumption of the plurality of industrial machines exceeding a power supply capacity of the power supply facilities, and the industrial machines are not sufficiently operated.

Industrial machines are accelerated by a servomotor. Acceleration of servomotor consumes power and deceleration of servomotor generates power in operation of an industrial machine. Regenerative power generated by such regeneration is used between industrial machines operating at the same timing. That is, when a plurality of industrial machines is present, at the timing when a certain industrial machine consumes power, another industrial machine performs power regeneration, and the total power consumption required for the operation of the plurality of industrial machines can be reduced. Further, reduction of the total power consumption of the plurality of industrial machines can reduce the capacity of the power supply facility and heat generation (power consumption) of a power supply path (for example, JP 2017-162300 A).

The industrial machines perform a series of operations according to respective purposes thereof such as a machine tool, a conveyor, a robot, etc. It is difficult to align the timing of the power-consuming operations and power-regenerating operations executed by industrial machines. However, the total of average power consumed by industrial machines can be reduced by shifting the start timing of series of operations executed by the industrial machines. Since the industrial machine independently operates based on a command of a control program, it is difficult to determine how to shift the start timing of operation of what industrial machine to lower a total value of the average power as a whole.

SUMMARY OF THE INVENTION

For this reason, there is a desire for a management device and a management system reducing a total value of average power consumed by whole industrial machines by adjusting operation timing of the industrial machines in accordance with operation states.

A management device according to an aspect of the application allocates a preset total suspension time to a plurality of industrial machines connected to one power supply facility, and shifts timing of starting a series of operations (for example, a series of operations commanded by one control program, etc.) of each industrial machine, thereby attempting minimization of average power consumed as an overall operation of the industrial machines corresponding to operation states of each industrial machine. A management device according to an aspect of the application learns allocation of a total rest time by trial and error using machine learning.

Further, an aspect of the application is a management device that determines, for each of a plurality of industrial machines supplied with power from a power supply facility, a time during which the industrial machine suspends operation after a series of operations on the industrial machine, the management device including a data acquisition unit for collecting data related to power consumption supplied to the plurality of industrial machines from at least the power supply facility, a preprocessing unit for creating power consumption data indicating information related to the power consumption supplied to the plurality of industrial machines during a predetermined time based on the data collected by the data acquisition unit, a learning model storage unit for storing a learning model associating a value of a behavior of allocating a predetermined total suspension time to the plurality of industrial machines with a state of power consumption by the plurality of industrial machines, a decision making unit for determining a behavior of allocating the predetermined total suspension time to the plurality of industrial machines with respect to a current state of power consumption by the plurality of industrial machines using the learning model stored in the learning model storage unit based on the power consumption data created by the preprocessing unit, and a suspension time allocation unit for allocating the total suspension time to the plurality of industrial machines based on determination by the decision making unit, and the management device decides the suspension time for each industrial machine to suspend an operation after a series of operations.

Another aspect of the application is a management system in which a plurality of management devices is connected to each other via a network, a learning result by a learning unit being allowed to be shared among the plurality of management devices.

DETAILED DESCRIPTION OF THE PREFERRED EMBODIMENTS

Hereinafter, embodiments of the application will be described with reference to the drawings.

Figure 1:
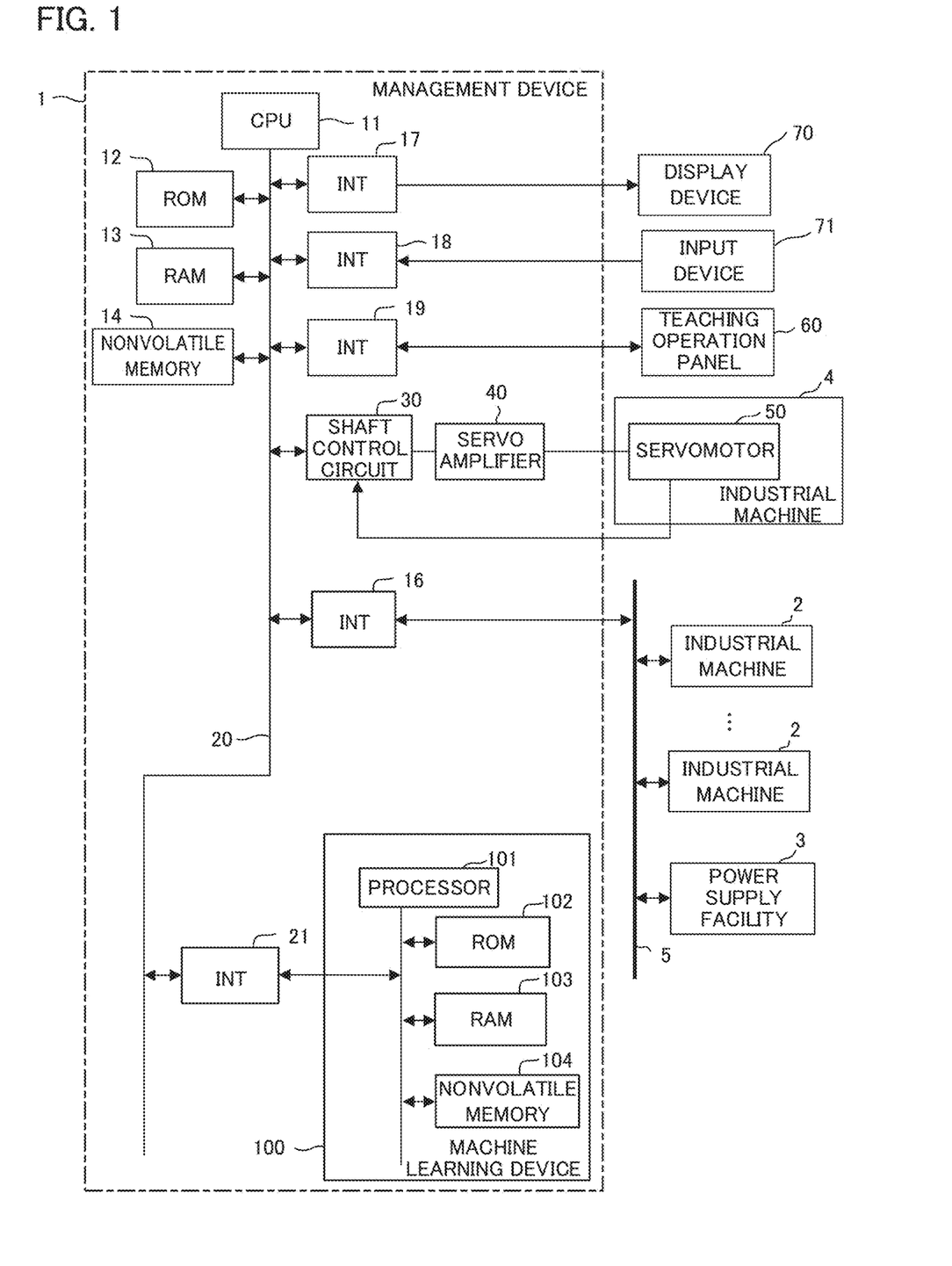
FIG. 1 is a hardware configuration diagram of a management device according to an embodiment.

FIG. 1 is a hardware configuration diagram illustrating a main part of a management device according to an embodiment of the application. The management device 1 of the present embodiment can be mounted as a controller that controls an industrial machine. In addition, the management device 1 can be mounted as a computer such as a personal computer installed with a controller that controls the industrial machine side by side or a cell computer, a fog computer, a cloud server, etc. connected to the controller that controls the industrial machine via a network. The present embodiment shows an example of a case where the management device 1 is mounted as the controller that controls the industrial machine.

A CPU 11 included in the management device 1 according to the present embodiment is a processor that controls the management device 1 as a whole. The CPU 11 reads a system program stored in a ROM 12 connected via a bus 22 and controls the entire management device 1 according to the system program. A RAM 13 stores temporary calculation data, display data to be displayed on a display device 70, various data input by an operator via a teaching operation panel 60 or an input device 71, etc.

A nonvolatile memory 14 includes, for example, a memory backed up by a battery (not illustrated), a solid state drive (SSD), etc., and is configured as a memory that retains a storage state even when the management device 1 is turned off. The nonvolatile memory 14 stores a setting area in which setting information related to an operation of the management device 1 is saved, data input from the input device 71 or the teaching operation panel 60 via each interface 19, a control program input via an interface (not illustrated), various data acquired via a network 5 from an industrial machine 2 or a power supply facility 3 under the management of the management device 1 (a control program executed in each industrial machine 2, average power or peak power consumed during a predetermined time acquired from the power supply facility 3, etc.), data read via an external storage device (not illustrated), etc. The program or various data stored in the nonvolatile memory 14 may be loaded in the RAM 13 during execution/use. In addition, a system program including a known analysis program for analyzing various data is written to the ROM 12 in advance.

The management device 1 is connected to the wired/wireless network 5 via an interface 16. The power supply facility 3 that supplies power to the management device 1 and the industrial machine controlled by the management device via a power supply path (not illustrated), at least one industrial machine 2 supplied with power from the power supply facility 3, etc. are connected to the network 5 to mutually exchange data with the management device 1. The industrial machine and each industrial machine 2 controlled by the management device can set a suspension time for taking a rest for a predetermined time after performance of a series of operations of the industrial machines (an operation of one cycle, for example, a series of operations commanded by one execution of the control program). When the suspension time is set, for example, the industrial machine and each industrial machine 2 controlled by the management device repeat an operation in which an operation is suspended for the set suspension time after the control program is executed, then the control program is executed again, and then the operation is suspended for the set suspension time.

The display device 70 displays data read into a memory, data obtained as a result of executing a program, etc., data output from a machine learning device 100 described later, etc. These data are output via interface 17. In addition, the input device 71 including a keyboard, a pointing device, etc. The input device 71 transfers commands, data, etc. to the CPU 11 via the interface. Commands are based on operations by the operator.

The teaching operation panel 60 is a manual data input device including a display, a handle, a hardware key, etc., which receives information from the management device 1 via the interface 19, displays the information. The teaching operation panel 60 transfers pulses, commands, and various data input from the handle, the hardware key, etc. to the CPU 11.

A shaft control circuit 30 controls a shaft that drives a movable portion of the industrial machine. The shaft control circuit 30 receives a movement amount command of the shaft from the CPU 11 and outputs a shaft command to a servo amplifier 40. The servo amplifier 40 drives the servomotor 50 by receiving this command. The servomotor 50 moves the shaft of the industrial machine. The servomotor 50 incorporates a position/speed detector, feeds back a position/speed feedback signal from the position/speed detector to the shaft control circuit 30, and performs position/speed feedback control. In the hardware configuration diagram of FIG. 1, only one shaft control circuit 30, one servo amplifier 40, and one servomotor 50 are illustrated. However, in practice, each of the number of prepared shaft control circuits 30, the number of prepared servo amplifiers 40, and the number of prepared servomotors 50 corresponds to the number of shafts provided in the industrial machine to be controlled. For example, when the industrial machine controlled by the management device 1 corresponds to a robot having six shafts, the shaft control circuit 30, the servo amplifier 40, and the servomotor 50 are prepared for each of the shafts.

An interface 21 connects the management device 1 and the machine learning device 100 to each other. The machine learning device 100 includes a processor 101 that controls the entire machine learning device 100, a ROM 102 that stores a system program, etc., a RAM 103 that performs temporary storage in each process related to machine learning, and a nonvolatile memory 104 used for storing a learning model, etc. The machine learning device 100 can observe various types of information (a control program to be executed by each industrial machine 2, average power or peak power consumed within a predetermined time acquired from the power supply facility 3, etc.). The management device can acquire the information 1 via the interface 21. Further, the management device 1 receives a result output from the machine learning device 100, controls display on the display device 70, controls the industrial machine, and outputs a command to each industrial machine 2 via the network 5.

Figure 2:
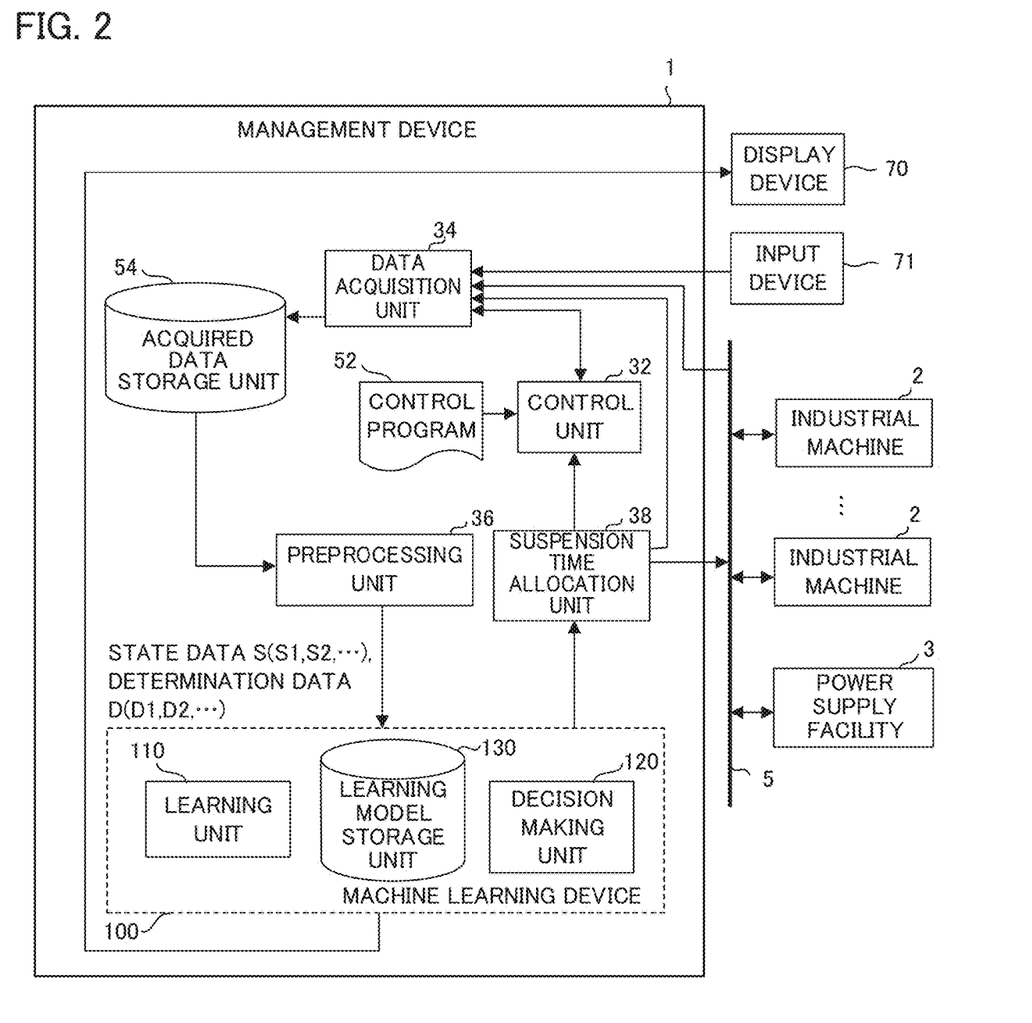
FIG. 2 is a block diagram of a management device according to a first embodiment.

FIG. 2 is a block diagram of the management device 1 and the machine learning device 100 according to an embodiment. The management device 1 of the present embodiment has a configuration required when the machine learning device 100 performs learning and a configuration required for processing based on decision making by the machine learning device 100. The functional block illustrated in FIG. 2 is realized by the CPU 11 included in the management device 1 and the processor 101 of the machine learning device 100 illustrated in FIG. 1. They execute respective system programs and control operations of respective units of the management device 1 and the machine learning device 100.

The management device 1 of the present embodiment includes a control unit 32, a data acquisition unit 34, a preprocessing unit 36, and a suspension time allocation unit

38. The machine learning device 100 of the management device 1 includes a learning unit 110 and a decision making unit 120. Further, the nonvolatile memory 14 in FIG. 1 includes an acquired data storage unit 54 that stores data acquired from the industrial machine 2, the power supply facility 3, etc. The nonvolatile memory 104 of the machine learning device 100 in FIG. 1 includes a learning model storage unit 130 that stores a learning model. The learning unit 110 constructs the learning model by means of machine learning.

The control unit 32 is a functional unit that controls an operation of the industrial machine to be controlled (industrial machine in which the servomotor 50 of FIG. 1 is incorporated) based on a control program 52 stored in the nonvolatile memory 104.

The control unit 32 controls the industrial machine to be controlled (i.e. the industrial machine in FIG. 1 which incorporates servomotor 50) based on control program 52.

The control unit 32 controls the industrial machine based on input by an operator to the teaching operation panel 60 and the control program 52 stored in the nonvolatile memory 14, etc. The control unit 32 controls each unit of the industrial machine. When the shaft of the industrial machine is to be controlled, command data is output to the servomotor 50 that drives the shaft. The command data instruct a change amount of a shaft angle for each control cycle. In addition, the control unit 32 acquires motor state quantities (current value, position, speed, acceleration, torque, etc. of the motor) of each servomotor 50. The servomotors are included in the industrial machine to be controlled.

The data acquisition unit 34 acquires various data from the control unit 32, the industrial machine 2, the power supply facility 3, the input device 71, etc. Data acquired by the data acquisition unit 34 include the control program 52 executed in the industrial machine to be controlled, control program executed in each industrial machine 2, suspension time set in each industrial machine, average power or peak power consumed within a predetermined time, for example. The average power or peak power are acquired from the power supply facility 3, etc. Data storage unit 54 stores acquired data in the acquired data storage unit 54. The data acquisition unit 34 may acquire data from another computer (not illustrated) via the external storage device (not illustrated) or the network 5. The suspension time set in each industrial machine may be acquired from the control unit 32 or each industrial machine 2. The suspension time allocation unit 38 may acquire a suspension time allocated to the control unit 32 and the industrial machine 2 in a previous machine learning operation cycle.

The preprocessing unit 36 creates state data used for learning by the machine learning device 100 based on the data acquired by the data acquisition unit 34. The preprocessing unit 36 converts the data acquired by the data acquisition unit 34 into a unified format treated by the machine learning device 100 (digitization, sampling, etc.), to create state data. In the case of reinforcement learning according to the present embodiment, the preprocessing unit 36 creates a set of state data S and determination data D in a predetermined format in the learning.

The state data S is data indicating a state of an environment, and includes power consumption data S1 related to consumption of power supplied from the power supply facility 3 and suspension time allocation data S2 indicating a behavior of allocating a total suspension time to each industrial machine performed under the power consumption indicated by the power consumption data S1.

The power consumption data S1 includes average power, peak power, time series data of consumed power, etc. The average power is an average of power supplied from the power supply facility 3 and consumed within a predetermined time by a plurality of industrial machines (an industrial machine to be controlled by the management device 1 and other industrial machines 2) during a predetermined observation time Tv determined in advance. The peak power consumption is a peak value of power supplied from the power supply facility 3 and consumed by a plurality of industrial machines during the predetermined observation time Tv determined in advance. The time series data of power consumption is time series data of power supplied from the power supply facility 3 and consumed by a plurality of industrial machines during the predetermined observation time Tv determined in advance. The power consumption data S1 may be obtained based on a detection value detected by a sensor such as a wattmeter (not illustrated) provided in the power supply facility 3, or obtained based on a detection value detected by a sensor such as a wattmeter (not illustrated) separately installed in the power supply path, etc.

Figure 3:
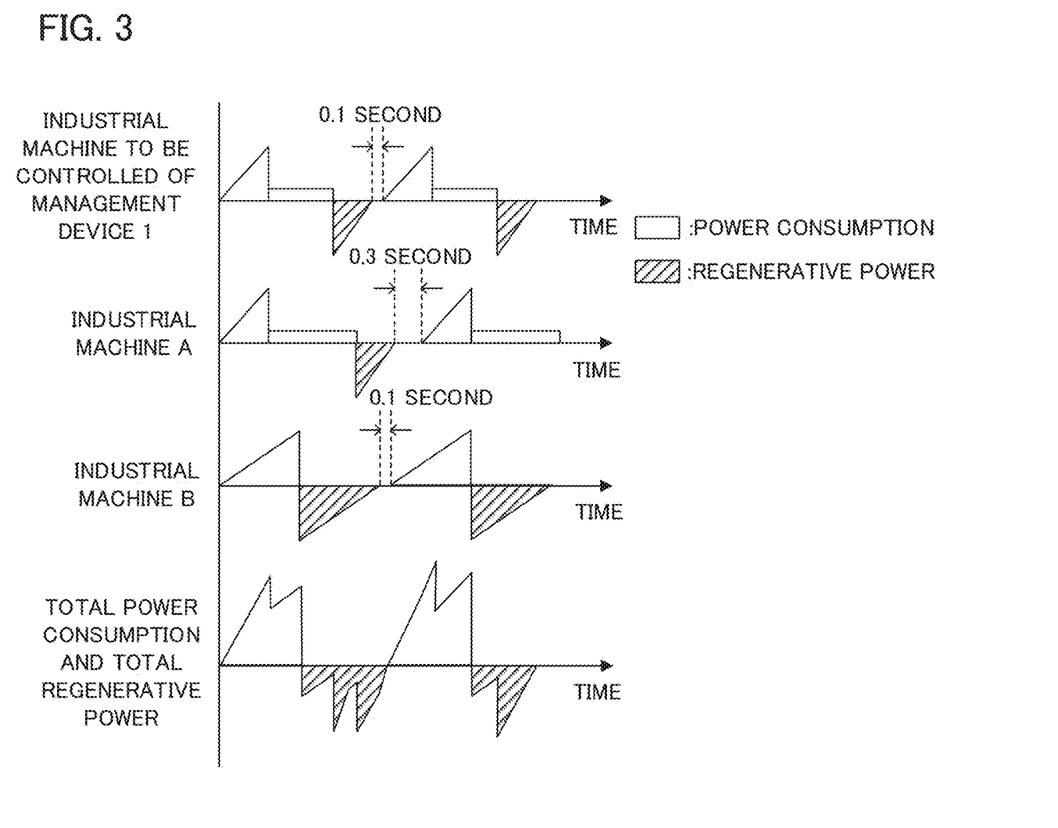
FIG. 3 is a diagram describing power consumption and power regeneration by an industrial machine.

FIG. 3 is a diagram illustrating an example of power consumption consumed in the industrial machine and regenerative power output from the industrial machine. In the example of FIG. 3, it is presumed that the industrial machine to be controlled by the management device 1 and other industrial machines A and B are supplied with power from the power supply facility 3. In FIG. 3, a horizontal axis is a time axis, power consumption is shown above the horizontal axis, and regenerative power is shown below the horizontal axis. In FIG. 3, in a series of sets of continuous power consumption and regenerative power shown for each industrial machine, at a time point when an operation of one cycle (cycle from a start to an end of execution of the control program) is completed, the operation is suspended for each predetermined suspension time (for example, a suspension time of 0.1 second in the case of the industrial machine to be controlled by the management device 1), and then an operation of a subsequent cycle is started. The regenerative power generated in each industrial machine is used in another industrial machine via the power supply path from the power supply facility 3, and power required for the power supply facility 3 is reduced by the amount of the regenerative power. A graph at a bottom of FIG. 3 depicts total power (upper part of the graph) supplied from the power supply facility 3 to each industrial machine. The average power consumed by the plurality of industrial machines used as the power consumption data S1 may be used by calculating, for example, an average output (square average output) of the total power consumption for a predetermined time (for example, 5 minutes) illustrated in FIG. 3. In addition, as the peak power consumption consumed by the plurality of industrial machines used as the power consumption data S1, for example, it is possible to use a maximum value of the total power consumption for a predetermined time (for example, 5 minutes) illustrated in FIG. 3. Furthermore, referring to the time series data of the power consumed by the plurality of industrial machines used as the power consumption data S1, for example, a predetermined time (for example, 5 minutes) of the total power consumption illustrated in FIG. 3 may be used as the time series data.

The suspension time allocation data S2 is data indicating allocation of a predetermined total suspension time to each industrial machine (the industrial machine to be controlled by the management device 1 and other industrial machines 2). The suspension time allocation data S2 is an action determined when a power consumption data S1 is observed. The suspension time allocation data S2 may be defined as a series of suspension time values allocated to the respective industrial machines 2 and 4. The predetermined total suspension time may be set by an operator in consideration of a cycle time of each industrial machine on a site, the number of industrial machines corresponding to a target of allocation, etc. For example, when an average cycle time of the industrial machines is 1 to 2 minutes, and several industrial machines are present, about 0.5 to 1 second may be set as the total suspension time. In FIG. 3, 0.5 second is set as the total suspension time, 0.1 second is allocated to the industrial machine 4 to be controlled by the management device 1, 0.3 second is allocated to the industrial machine A, and 0.1 second is allocated to the industrial machine B. For example, the suspension time allocation data S2 at this time takes values of (0.1, 0.3, and 0.1).

The determination data D is created by the preprocessing unit 36 which is used for determination (evaluation) for the average power or the peak power consumption. The power consumed within a predetermined time by a plurality of industrial machines 2 and 4. The determination data D is created when a power consumption data S1 is observed after an action of allocating the total suspension time to each industrial machine 2 and 4. The allocation is indicated by the suspension time allocation data S2. The determination data D includes at least the power consumption data D1 which indicates a degree of improvement in the average power or the peak power consumption consumed by the plurality of industrial machines 2 and 4 within the predetermined time.

The power consumption data D1 may correspond to an improvement amount (deterioration amount) of the average power or the peak power consumption consumed within the predetermined time by the plurality of industrial machines 2 and 4 before and after allocating the total suspension time. The total suspension time is predetermined and indicated as suspension time allocation data S2.

The learning unit 110 performs machine learning using the data created by the preprocessing unit 36. The learning unit 110 generates a learning model that learns a behavior of allocating the total suspension time to each industrial machine 2 and 4 with respect to a state of the power consumption supplied from the power supply facility 3 using a known reinforcement learning method, and stores the generated learning model in the learning model storage unit 130. Reinforcement learning is a method of learning. A cycle repeats in reinforcement learning, in which a current state (that is, input) of an environment where a learning object is present is observed, a predetermined behavior (that is, output) is executed in the current state, and a reward is given to the behavior. Reinforcement learning learns a policy (in the machine learning device of the application, a behavior of allocating the total suspension time to each industrial machine 2 and 4) which maximize the total of reward as more appropriate solution in a trial-and-error manner. Examples of reinforcement learning performed by the learning unit 110 include Q-learning.

In Q-learning, the learning unit 110 can determine the reward R as "excellent" and set as positive (plus) when average power for a predetermined time supplied from the power facility 3 is reduced (improved) than average power before adjustment, and determined as "negation" and set as a negative (minus) reward R when average power for a predetermined time supplied from the power supply facility 3 is not reduced from average power before adjustment or when the average power increases (deteriorates).

Alternatively, for example, the reward R may be determined to be "excellent" and set as a positive (plus) reward R when peak power for a predetermined time supplied from the power supply facility 3 is reduced (improved) than peak power before adjustment, and determined to be "negation" and set as a negative (minus) reward R when peak power for a predetermined time supplied from the power supply facility 3 is not reduced from peak power before adjustment or when the peak power increases (deteriorates). A value of the reward R may be changed according to a degree of reduction or increase. Further, as a determination condition, when the determination data D includes a plurality of pieces of data, determination may be performed by combining the plurality of pieces of data.

In Q-learning, the learning unit 110 can use a behavior value table as a learning model. The table associates a state data S, the determination data D, and the reward R with a behavior value (for example, a numerical value) represented by a function Q. In this case, learning by the learning unit 110 has the same meaning as updating the behavior value table by the learning unit 110. Since a correlation between a current state of the environment and allocation of the total suspension time for the plurality of industrial machines is unknown at the start of Q-learning, various state data S, determination data D, and rewards R are prepared in a form associated with a value (function Q) of a randomly determined behavior value in the behavior value table. When learning is advanced, the value (function Q) of the behavior value is rewritten based on the state data S, the determination data D, and the calculated reward R, and the behavior value table is updated. By repeating this update, the value (function Q) of the behavior value displayed in the behavior value table is rewritten so that the more appropriate the behavior is, the larger the value is. Then, when learning is sufficiently progressed, it is possible to select a more appropriate total suspension time allocation behavior for the current state merely by referring to the behavior value table.

The learning unit 110 may be configured to use a neural network as a value function Q (learning model) to set state data S and a behavior "a" as an input of the neural network and set a value (result y) of the behavior "a" in the state as an output. In such a configuration, a neural network having three layers of an input layer, an intermediate layer, and an output layer may be used as a learning model. However, more effective learning and inference may be performed using a so-called deep learning method which uses a neural network having three or more layers. The learning model generated by the learning unit 110 is stored in the learning model storage unit 130 provided on the nonvolatile memory 104, and used by the decision making unit 120 for determining the total suspension time allocation behavior for each industrial machine.

The learning unit 110 is indispensable at a learning stage, and is not necessarily indispensable after the learning unit 110 completes learning of the total suspension time allocation behavior for each industrial machine. For example, when the machine learning device 100 completing learning is shipped to a customer, the learning unit 110 may be removed.

The decision making unit 120 obtains a more appropriate solution to the total suspension time allocation behavior for each industrial machine 2 and 4 using the learning model stored in the learning model storage unit 130 based on the state data S input from the preprocessing unit 36, and outputs the total suspension time allocation behavior for each industrial machine 2 and 4. In the decision making unit 120 of the present embodiment, a reward for taking the behavior in a current state is calculated by inputting, as input data, the state data S (power consumption data S1, etc.) input from the preprocessing unit 36 and the total suspension time allocation behavior for each industrial machine 2 and 4 to the learning model generated (parameter is determined) with reinforcement learning by the learning unit 110. The decision making unit 120 calculates rewards with respect to every allocation behavior of the total suspension time can be currently taken, compares a plurality of calculated rewards, and determines a total suspension time allocation behavior with respect to each industrial machine 2 and 4 for which a largest reward is calculated as a more appropriate solution. The more appropriate solution to the total suspension time allocation behavior with respect to each industrial machine determined by the decision making unit 120 may be used by, for example, being output to be displayed on the display device 70 or output to be transmitted to a host computer, a cloud computer, etc. via a wired/wireless network (not illustrated) in addition to being output to the suspension time allocation unit 38.

The suspension time allocation unit 38 outputs the suspension times allocated to the industrial machine 4 to be controlled by the management device 1 and other industrial machines 2. The suspension time is based on allocation of the total suspension time to each industrial machine 2 and 4. The allocation is input from the decision making unit 120. The suspension time allocation unit 38 outputs the suspension time of the industrial machine 4 to be controlled by the management device 1 to the control unit 32. The suspension time allocation unit 38 sets the suspension time. The control unit 32 takes the suspension time in a timely manner during execution of the control program 52. In addition, the suspension time allocation unit 38 outputs the suspension times allocated to other industrial machines 2 to the respective industrial machines 2 through the network 5, and sets the suspension times. The respective industrial machines 2 take the suspension times in a timely manner during a series of control operations.

The management device 1 having the above-described configuration changes allocation of the suspension time for each industrial machine 2 and 4 while observing the overall power consumption state of a plurality of industrial machines 2 and 4 supplied with power from the same power supply facility 3. As a result, timings of power consumption and the power regeneration in each industrial machine 2 and 4 are shifted in time compared to before allocation. That is, in allocation of a certain suspension time, timing of power consumption in a certain industrial machine 2 or 4 is shifted from timing of power regeneration in another industrial machine 2 or 4. In allocation of another suspension time, timing of power consumption in a certain industrial machine 2 or 4 coincides with timing of power regeneration in another industrial machine 2 or 4. While repeating such allocation behavior, the machine learning device 100 included in the management device 1 can learn how a power consumption state changes when what allocation of the total suspension time is performed in what power consumption state, and output and set a more appropriate allocation solution to the total suspension time for a current power consumption state eventually.

Hereinafter, a description will be given of a management system according to a second embodiment. In the system, the management device 1 is implemented as a computer such as a fog computer, a cloud server, etc.

Figure 4:
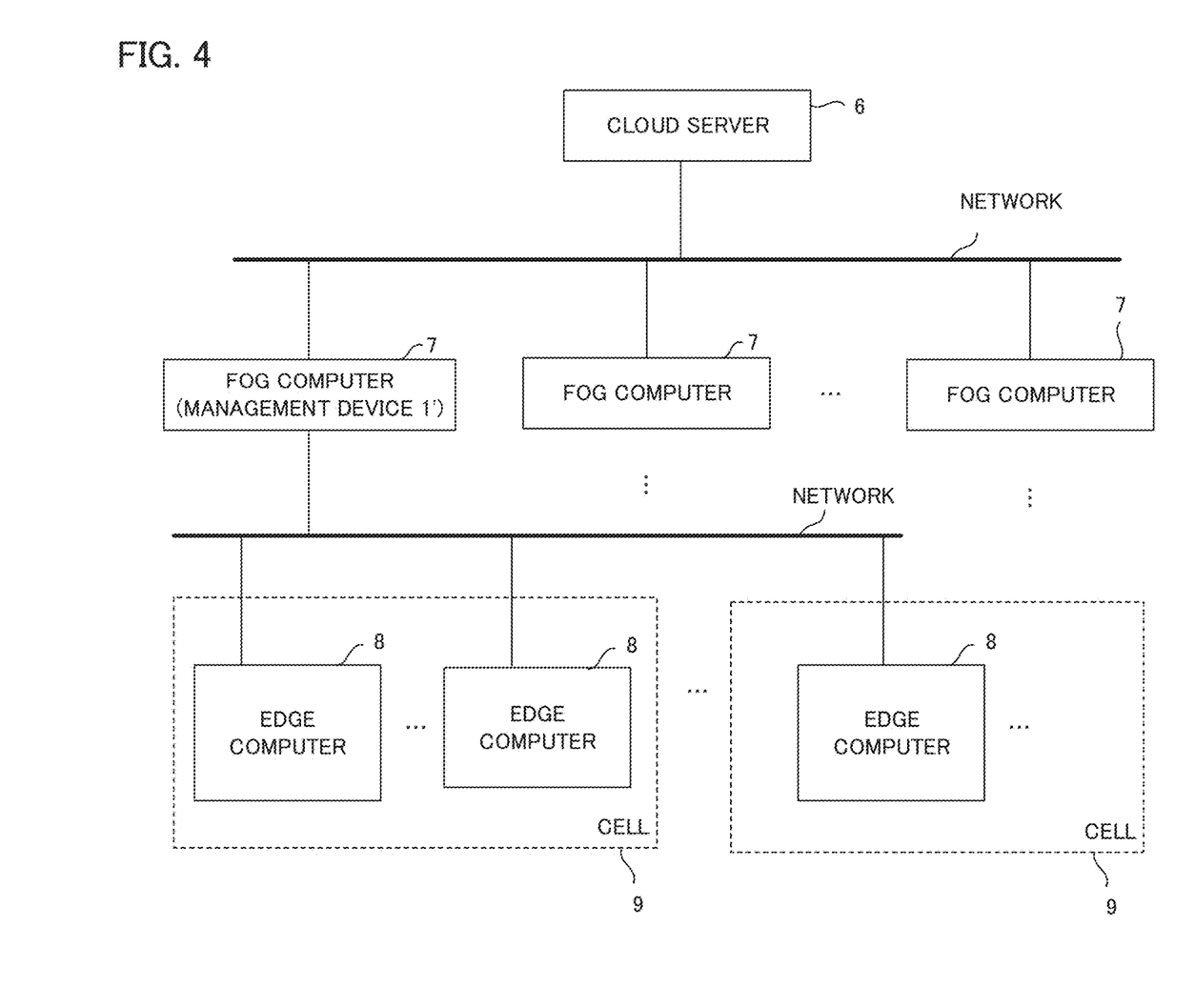
FIG. 4 is a diagram illustrating an operating environment of a management system according to an embodiment.

FIG. 4 is a diagram illustrating an environment in which the management system according to the second embodiment operates. As illustrated in FIG. 4, the management system according to the present embodiment operates in a system environment in which each of a plurality of devices including a cloud server 6, a fog computer 7, and an edge computer 8 is connected to a wired/wireless network. The system illustrated in FIG. 4 is logically divided into three layers of a layer including the cloud server 6, etc., a layer including the fog computer 7, etc., and a layer including the edge computer 8 (a robot controller that controls a robot included in a cell 9, a controller that controls a machine tool, a peripheral machine such as a conveying machine, a power supply facility, etc.), etc. On such a system, the management system according to the present embodiment is configured by mounting the function of the management device 1 described in the first embodiment on a computer such as the cloud server 6 or the fog computer 7. In the management system according to the second embodiment, it is possible to mutually share data among a plurality of respective devices via a network, collect various data acquired by the edge computer 8 in the fog computer 7 or the cloud server 6 to perform a large-scale analysis, and control an operation of each edge computer 8 based on an analysis result. In the system illustrated in FIG. 4, a plurality of cells 9 is provided in each factory (for example, one cell 9 is provided for each floor of the factory), and an upper-layer fog computer 7 manages each cell 9 in a predetermined unit (a factory unit, a plurality of factory units of the same manufacturer, etc.). Further, data collected and analyzed by the fog computer 7 is further collected and analyzed by the cloud server 6 of the upper layer, and information obtained as a result can be used for control, etc. in each edge computer 8.

Figure 5:
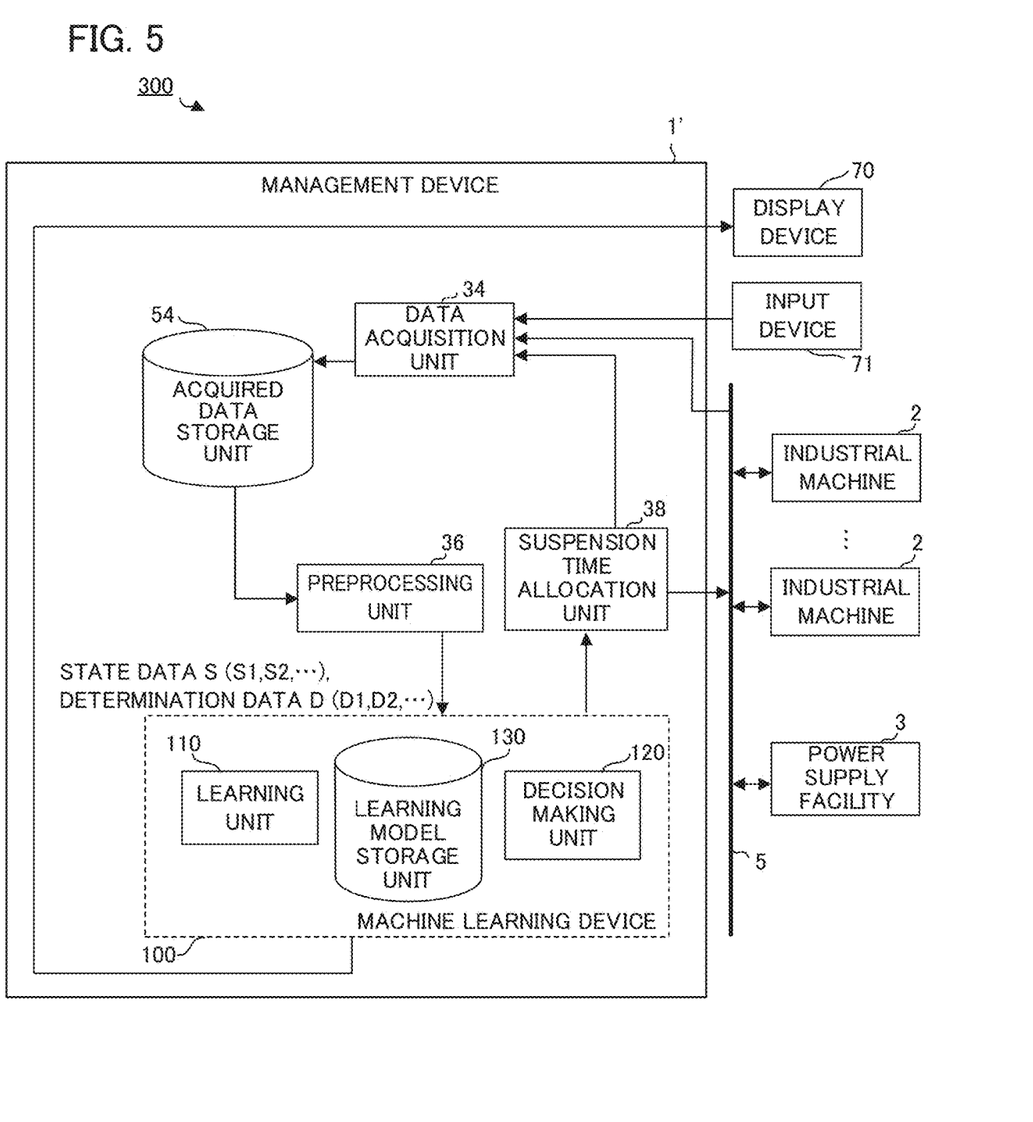
FIG. 5 is a block diagram of a management system according to a second embodiment.

FIG. 5 is a schematic configuration diagram of the management system according to the present embodiment. The management system 300 according to the present embodiment includes a management device 1' mounted on a computer such as the cloud server 6 or the fog computer 7, a plurality of industrial machines 2 as edge computers connected to the management device 1' via the network 5, the power supply facility 3 for supplying power to the plurality of industrial machines 2, etc. The management device 1' included in the management system 300 according to the present embodiment has the same configuration as that of the management device 1 described in FIG. 2 except that the control unit 32 is not included.

In the management system 300 according to the present embodiment, the management device 1' allocates the total suspension time to a plurality of industrial machines 2 under management. The machine learning device 100 included in the management device 1' can learn how a power consumption state changes when what allocation of the total suspension time is performed in what power consumption state for the plurality of industrial machines 2 under management, and output and set a more appropriate allocation solution to the total suspension time for a current power consumption state some time.

Figure 6:
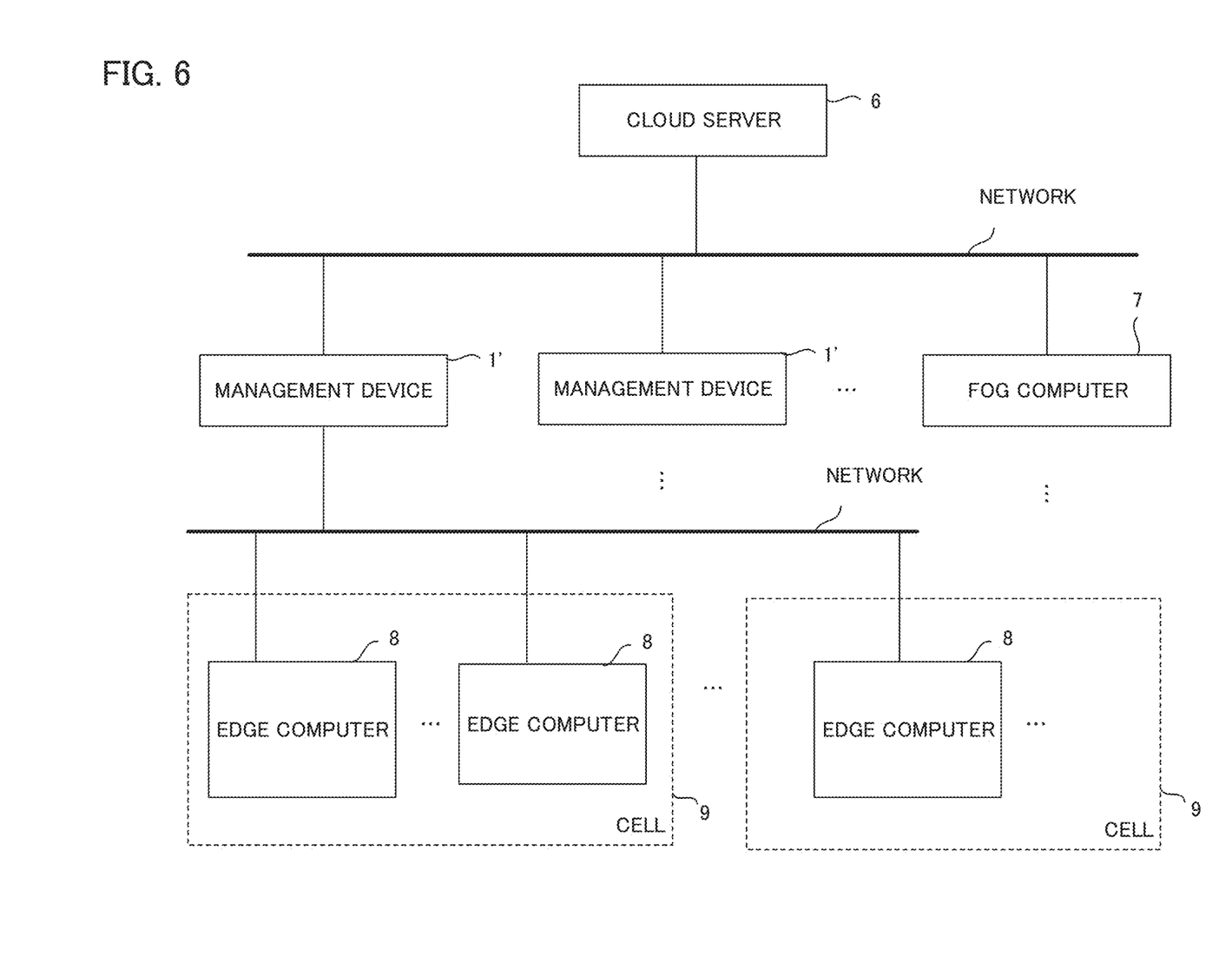
FIG. 6 is a diagram illustrating a system in which a plurality of management systems operates.

FIG. 6 illustrates an example in which a plurality of management systems 300 is introduced into the system environment illustrated in FIG. 4. The system illustrated in FIG. 6 includes the plurality of management systems 300 (not illustrated). The system 300 is mounted with management devices 1' on the fog computer 7. Each management device 1' manages a plurality of edge computers 8 and is configured to be able to perform learning based on data collected from a plurality of industrial machines (edge computers 8) under management and mutually exchange a learning model (i.e. result of learning) with another management device 1' directly or via the cloud server 6.

The management system 300 can acquire and use a learning model from another management system 300 if the both management systems 300 include similar industrial machines and have similar configurations. The labor of pilot operation work for building a learning model can be greatly reduced at the time of factory startup by using a learning model already acquired from the management system 300 with similar configuration with the newly established factory.

Even though the embodiments of the application have been described above, the application is not limited only to the above-described embodiments, and can be implemented in various modes by making appropriate changes.

For example, in the above-described embodiments, the management device 1 and the machine learning device 100 are described as devices having different CPUs (processors). However, the machine learning device 100 may be realized by the CPU 11 provided in the management device 1 and the system program stored in the ROM 12.

The invention claimed is:

1. A management device of a plurality of industrial machines supplied with power from a power supply facility, the management device comprising:
a processor configured to
collect data (i) related to power consumption supplied to the plurality of industrial machines from at least the power supply facility and (ii) obtained based on a detection value detected by a sensor, and
create power consumption data indicating information related to the power consumption supplied to the plurality of industrial machines during a predetermined time based on the collected data; and
a learning model storage for storing a learning model associating a value of a behavior of allocating a predetermined total suspension time to the plurality of industrial machines with a state of power consumption by the plurality of industrial machines, wherein
the processor is further configured to
determine a behavior of allocating the predetermined total suspension time to the plurality of industrial machines with respect to a current state of power consumption by the plurality of industrial machines using the learning model stored in the learning model storage based on the created power consumption data,
allocate the total suspension time to the plurality of industrial machines based on the determined behavior, and
decide the suspension time for each industrial machine to suspend an operation after a series of operations.

2. The management device according to claim 1, wherein the processor is further configured to
collect a suspension time after a series of operations of the industrial machine,
create the power consumption data, suspension time allocation data, and power consumption determination data, and
generate a learning model,
the suspension time allocation data indicate allocation of the predetermined total suspension time to the plurality of industrial machines after a state of power consumption indicated by the power consumption data is observed,
the power consumption determination data indicates a determination result for power consumption within a predetermined time by the plurality of industrial machines in the case where the total suspension time indicated by the power consumption data is allocated after the power consumption indicated by the power consumption data is observed, and
the learning model associates states of power consumption by the plurality of industrial machines with allocation behavior of the predetermined total suspension time to the plurality of industrial machines based on the power consumption data, the suspension time allocation data, and the power consumption determination data.

3. The management device according to claim 2, wherein the processor is further configured to set a plus reward when average power consumed by the plurality of industrial machines within the predetermined time is reduced and set a minus reward when average power consumed by the plurality of industrial machines within the predetermined time is not reduced or when the average power increases, and generate the learning model based on a value of the reward.

4. The management device according to claim 1, wherein the learning model is a behavior value table associating and storing a value of a behavior of allocating the predetermined total suspension time to the plurality of industrial machines with a state of power consumption by the plurality of industrial machines.

5. The management device according to claim 1, wherein the learning model is a neural network having a multi-layer structure.

6. A management system, comprising:
a plurality of management devices connected to each other via a network, wherein
each management device among the plurality of management devices is for a plurality of industrial machines supplied with power from a power supply facility, and comprises:
a processor configured to
collect data (i) related to power consumption supplied to the plurality of industrial machines from at least the power supply facility and (ii) obtained based on a detection value detected by a sensor, and
create power consumption data indicating information related to the power consumption supplied to the plurality of industrial machines during a predetermined time based on the collected data; and
a learning model storage for storing a learning model associating a value of a behavior of allocating a predetermined total suspension time to the plurality of industrial machines with a state of power consumption by the plurality of industrial machines, wherein
the processor is further configured to
determine a behavior of allocating the predetermined total suspension time to the plurality of industrial machines with respect to a current state of power consumption by the plurality of industrial machines using the learning model stored in the learning model storage based on the created power consumption data,
allocate the total suspension time to the plurality of industrial machines based on the determined behavior, and
decide the suspension time for each industrial machine to suspend an operation after a series of operations, the processor is further configured to
- collect a suspension time after a series of operations of the industrial machine,
- create the power consumption data, suspension time allocation data, and power consumption determination data, and
- generate a learning model, the suspension time allocation data indicate allocation of the predetermined total suspension time to the plurality of industrial machines after a state of power consumption indicated by the power consumption data is observed, the power consumption determination data indicates a determination result for power consumption within a predetermined time by the plurality of industrial machines in the case where the total suspension time indicated by the power consumption data is allocated after the power consumption indicated by the power consumption data is observed, the learning model associates states of power consumption by the plurality of industrial machines with allocation behavior of the predetermined total suspension time to the plurality of industrial machines based on the power consumption data, the suspension time allocation data, and the power consumption determination data, and a learning result by the processor of one of the plurality of management devices is allowed to be shared among the plurality of management devices.

* * * * *